(12) United States Patent
Keith

(10) Patent No.: US 10,145,400 B1
(45) Date of Patent: Dec. 4, 2018

(54) CLIP

(71) Applicant: Jerry Keith, San Antonio, FL (US)

(72) Inventor: Jerry Keith, San Antonio, FL (US)

( * ) Notice: Subject to any disclaimer, the term of this patent is extended or adjusted under 35 U.S.C. 154(b) by 258 days.

(21) Appl. No.: 15/166,074

(22) Filed: May 26, 2016

(51) Int. Cl.
*F16B 5/06* (2006.01)
*F16B 2/12* (2006.01)
*H04W 88/08* (2009.01)

(52) U.S. Cl.
CPC ............ *F16B 5/0607* (2013.01); *F16B 2/12* (2013.01); *F16B 2005/0678* (2013.01); *H04W 88/08* (2013.01)

(58) Field of Classification Search
CPC .. F16B 5/0607; F16B 2/12; F16B 2005/0678; H04W 88/08
See application file for complete search history.

(56) References Cited

U.S. PATENT DOCUMENTS

| | | | |
|---|---|---|---|
| 7,175,143 B1* | 2/2007 | Ho .................... | A47G 29/083 248/215 |
| 7,484,701 B2* | 2/2009 | Hsieh .................... | A47F 5/0853 211/106.01 |
| 9,618,153 B2* | 4/2017 | Hale ................... | F16M 13/02 |
| 9,751,205 B2* | 9/2017 | Huang .................... | B25G 1/04 |
| 9,776,577 B2* | 10/2017 | Carnevali ............... | B60R 11/02 |
| 9,913,526 B2* | 3/2018 | Abreu .................... | A45F 5/00 |
| 2014/0021420 A1* | 1/2014 | Beelen .................... | F16B 2/12 254/30 |
| 2014/0097306 A1* | 4/2014 | Hale .................... | F16M 13/022 248/122.1 |
| 2015/0028170 A1* | 1/2015 | Fan .................... | F16M 11/04 248/176.3 |
| 2015/0049204 A1* | 2/2015 | Okabe .................... | G03B 17/12 348/207.1 |
| 2016/0018050 A1* | 1/2016 | Solheim ............. | A63B 69/3632 248/181.1 |
| 2016/0084434 A1* | 3/2016 | Janway ............. | A61M 5/16813 361/601 |
| 2016/0198838 A1* | 7/2016 | Abreu .................... | A45F 5/02 224/183 |
| 2016/0273703 A1* | 9/2016 | Li ............... | A45F 5/00 |
| 2016/0297062 A1* | 10/2016 | Huang ................ | F16M 13/04 |
| 2017/0350555 A1* | 12/2017 | Jertson ............. | A63B 69/3632 |

* cited by examiner

*Primary Examiner* — Robert Sandy
*Assistant Examiner* — Louis A Mercado
(74) *Attorney, Agent, or Firm* — Gulf Coast Intellectual Property Group

(57) ABSTRACT

A clip configured to releasably secure opposing halves of a fiberglass shroud surroundably mounted to a cellular tower. The clip includes a first tube member and a second tube member wherein the second tube member has a diameter that is less than that of the first tube member. The second tube member is slidably coupled with the first tube member wherein the second tube member is partially disposed within the interior volume of the first tuber member. A first post and a second post are distally mounted and each have a portion extending into the first tube member and second tube member respectively. A spring is present within the interior volume of the first tube member and second tube member and is operably coupled to the first post and second post. The first post and second post have angular portions configured to help maintenance of the clip's position.

20 Claims, 3 Drawing Sheets

CLIP

FIELD OF THE INVENTION

The present invention relates generally to securing devices, more specifically but not by way of limitation, a clip operable to secure opposing halves of a fiberglass shroud of a cellular phone tower.

BACKGROUND

As cellular devices have proliferated society the need for bandwidth and signal strength has dramatically increased. In order to accommodate the demand a significant investment in the cellular network infrastructure has taken place over the last decade. As a part of this infrastructure cellular towers are being placed in numerous locations. Many municipalities and other organizations have objected to large cellular tower installations and the industry has accommodated by utilizing cellular towers that resemble a large flag pole.

As is known in the art, the cellular towers that are constructed to resemble a large flagpole have an external fiberglass shroud that is constructed of opposable halves that are releasably secured. The opposable halves must be removed in order to perform any required maintenance or repairs to the cellular tower. While conventional fasteners have been utilized, they have proven to be inefficient and result in the requirement of more time to remove and replace the fiberglass shroud during maintenance of the cellular tower.

Accordingly, there is a need for a clip that is configured to releasably secure the opposable halves of a fiberglass cellular tower that can be installed and removed without the need for hand tools.

SUMMARY OF THE INVENTION

It is the object of the present invention to provide a clip configured to releasably secure opposable halves of the fiberglass shroud of a cellular tower that includes a first tube member and a second tube member that are slidably coupled.

Another object of the present invention is to provide a clip operable to secure the external shroud of a cellular tower wherein the second tube member has a diameter that is less than that of the first tube member so as to facilitate the slidable engagement therebetween.

A further object of the present invention is to provide a clip configured to releasably secure opposable halves of the fiberglass shroud of a cellular tower that further includes a first post and a second post distally mounted on the clip.

Still another object of the present invention is to provide a clip operable to secure the external shroud of a cellular tower wherein the first post and second post extend into the interior volume of the first tube member and second tube member respectively.

An additional object of the present invention is to provide a clip configured to releasably secure opposable halves of the fiberglass shroud of a cellular tower that further includes a spring operably coupled intermediate the first post and second post wherein the spring is configured to provide a bias so as to move the clip to its first position.

Yet a further object of the present invention is to provide a clip operable to secure the external shroud of a cellular tower wherein the clip further includes a keeper, the keeper being secured to the first post and being operable to ensure the clip will remain proximate the cellular tower if dropped by a user.

Another object of the present invention is to provide a clip configured to releasably secure opposable halves of the fiberglass shroud of a cellular tower that includes an alternative embodiment wherein the ends of the first tube member and second tube member are arcuate in shape.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
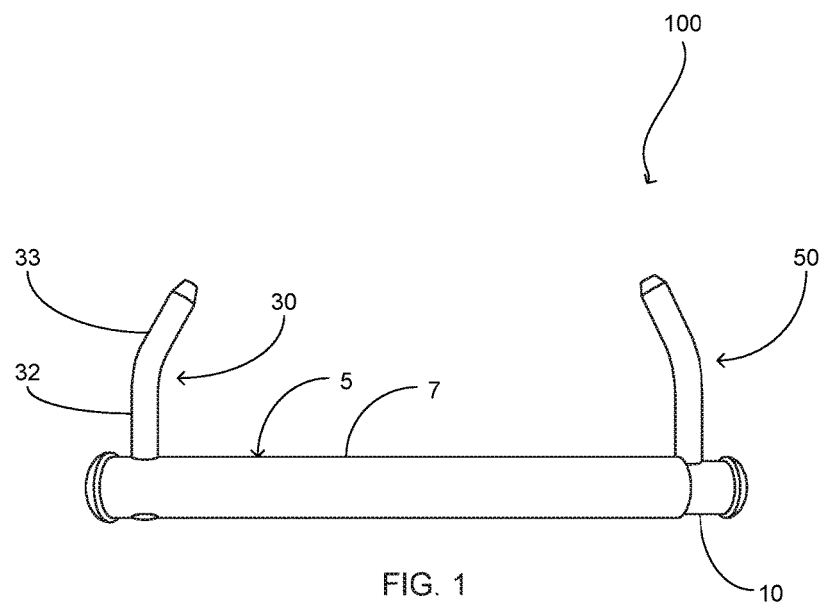
FIG. 1 is a side view of the present invention in its first position.

Referring now to the drawings submitted herewith, wherein various elements depicted therein are not necessarily drawn to scale and wherein through the views and figures like elements are referenced with identical reference numerals, there is illustrated a clip 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
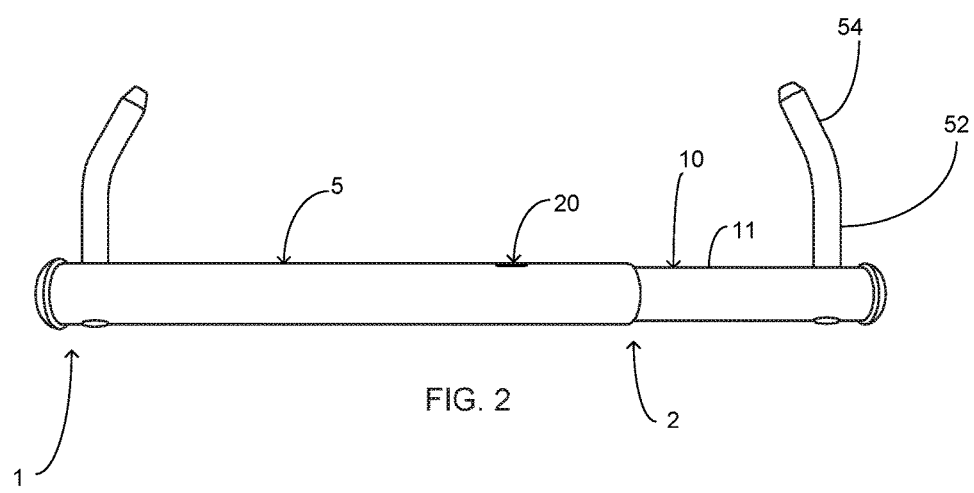
FIG. 2 is a side view of the present invention in its second position.

Referring now in particular to FIG. 1 and FIG. 2 herein, the clip 100, includes a first tube member 5 and a second tube member 10 that are slidably coupled and configured to be moved intermediate a first position and a second position. The first tube member 5 is manufactured from a durable rigid material such as but not limited to metal and includes outer wall 7 forming an interior volume 8. The first tube member 5 is cylindrical in shape having a first end 1 and a second end 2 wherein an opening (not illustrated herein is present proximate second end 2. The opening is configured to be of suitable size so as to accommodate the second tube member 10 therethrough. The first tube member 5 is manufactured having a sufficient length so as to completely receive the second tube member 10 therein.

The second tube member 10 is manufactured from a suitable durable material such as but not limited to metal and includes outer wall 11. The outer wall 11 is cylindrical in shape and is manufactured having a diameter that is less than that of outer wall 7. The second tube member 10 is substantially hollow having an interior volume 12. The second tube member 10 has a first end 13 and second end 14. Second end 14 is manufactured so as to have a slight flare in order to engage depression 20 when the clip 100 is being moved to its second position illustrated herein in FIG. 2. The slight flare of the outer wall 11 proximate second end 14 ensures that the second tube member 10 is not completely removed from the interior volume 8 of the first tube member 5. While a single depression 20 is illustrated as being formed in the outer wall 7 herein, it is contemplated within the scope of the present invention that the outer wall 7 could have more than one depression formed therein. Furthermore, it is contemplated within the scope of the present invention that alternate configurations could be utilized to ensure that the second tube member 10 cannot be completely removed from the interior volume 8 of the first tube member 5 during transition from the first position to the second position.

Secured to the first tube member 5 is first post 30. First post 30 is manufactured from a suitable durable material such as but not limited to metal. The first post 30 is journaled through the outer wall 7 and is secured within the interior volume 8 utilizing suitable durable techniques such as but not limited to welding. The first post 30 is secured proximate first end 1 and includes a first portion 32 and second portion 33. The first portion 32 and second portion 33 are contiguously formed and are angular with respect to each other. The angular manner of the second portion 33 with respect to the first portion 32 assists in the maintenance of the engagement of the clip 100 with the exemplary fiberglass shroud 99. It should be recognized that the first portion 32 and second portion 33 could be manufactured without an angle therebetween and further that the angular manner therebetween could vary. Second portion 33 includes tip 34 that is rounded in shape so as to prevent damage to the fiberglass shroud 99 during utilization of the clip 100. First post 30 includes a second portion 33 that is hollow having an opening 35 and an interior volume 36. A keeper 40 is secured to the second portion with wire 41. The wire 41 is secured within the interior volume 36 and is operable to maintain the keeper 40 engaged with the second portion 33. The keeper 40 is configured to be inserted into the fiberglass shroud 99 and functions to provide a safety feature that if a user of the clip 100 fails to maintain a grasp thereon, the clip 100 will not fall to the ground as the keeper 40 will engage the fiberglass shroud 99 and prevent the clip 100 from falling to the ground. It is contemplated within the scope of the present invention that the keeper 40 could be manufactured from various materials and be formed in alternate shapes and achieve the desired objective listed herein. It is further contemplated within the scope of the present invention that numerous other techniques to the keeper 40 could be employed in order to achieve the desired objective stated herein.

Secured to the second tube member 10 is second post 50. The second post 50 is secured to the second tube member 10 being journaled through outer wall 11 and secured within the interior volume 12 utilizing suitable durable techniques such as but not limited to welding. The second post 50 is manufactured from a suitable durable material such as but not limited to metal and includes a first portion 52 and second portion 53 that are contiguous and angular with respect to each in the same manner as the first portion 32 and second portion 33 of the first post 30. The second portion 54 is angled towards first post 30 and as previously described herein the angular configuration assist in the engagement process with the fiberglass shroud 99. The second post 50 is mounted proximate first end 13 of the second tube member 10. While not illustrated herein, it is contemplated that the second post 50 could be constructed with a keeper 40 similarly to the first post 30.

Figure 3:
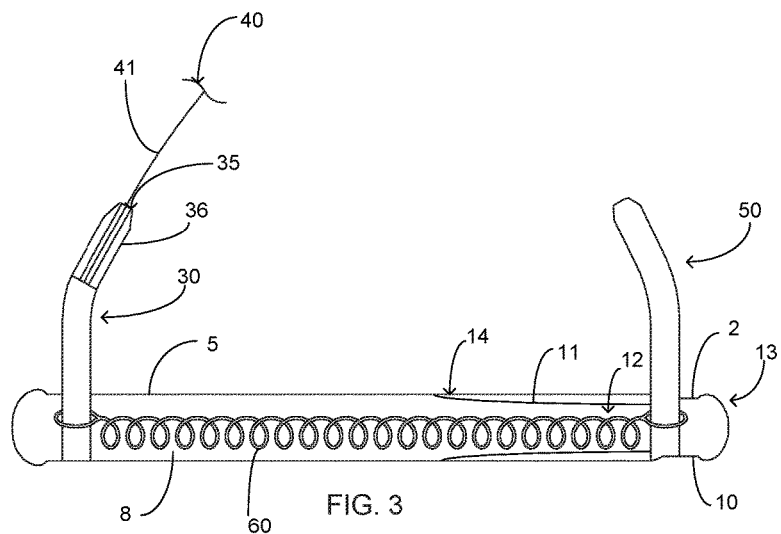
FIG. 3 is a cross-sectional view of the present invention.
Figure 4:
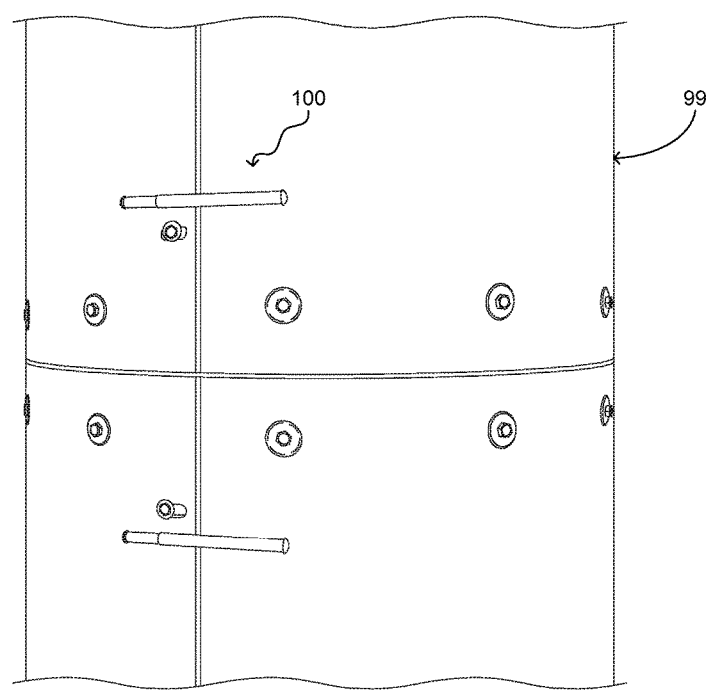
FIG. 4 is a perspective view of the present invention coupled to an exemplary cellular tower shroud.

As shown herein in FIG. 3, the clip 100 includes a spring 60. Spring 60 is a conventional spring that is operably coupled to the first post 30 and second post 50. The spring 60 provides a bias force so as to drive the clip 100 towards its first position. As a user utilizes the clip 100 to couple opposable halves of the exemplary fiberglass shroud 99, the clip 100 is moved from its first position, shown herein in FIG. 1, towards its second position, illustrated herein in FIG. 2. The clip 100 is moved towards its second position to a sufficient manner so as to allow engagement of holes (not illustrated herein) formed in the fiberglass shroud 99. Ensuing engagement of the fiberglass shroud 99, the spring 60 maintains a biased pulling force that acts to pull the first post 30 towards the second post 50 so as to maintain a secure connection intermediate the opposable halves of the fiberglass shroud. While a spring 60 is illustrated herein as being configured to maintain a biased pulling force intermediate the first post 30 and second post 50, it is contemplated within the scope of the present invention that alternate elements could be utilized to achieve the desired objective of the spring 60 stated herein.

Figure 5:
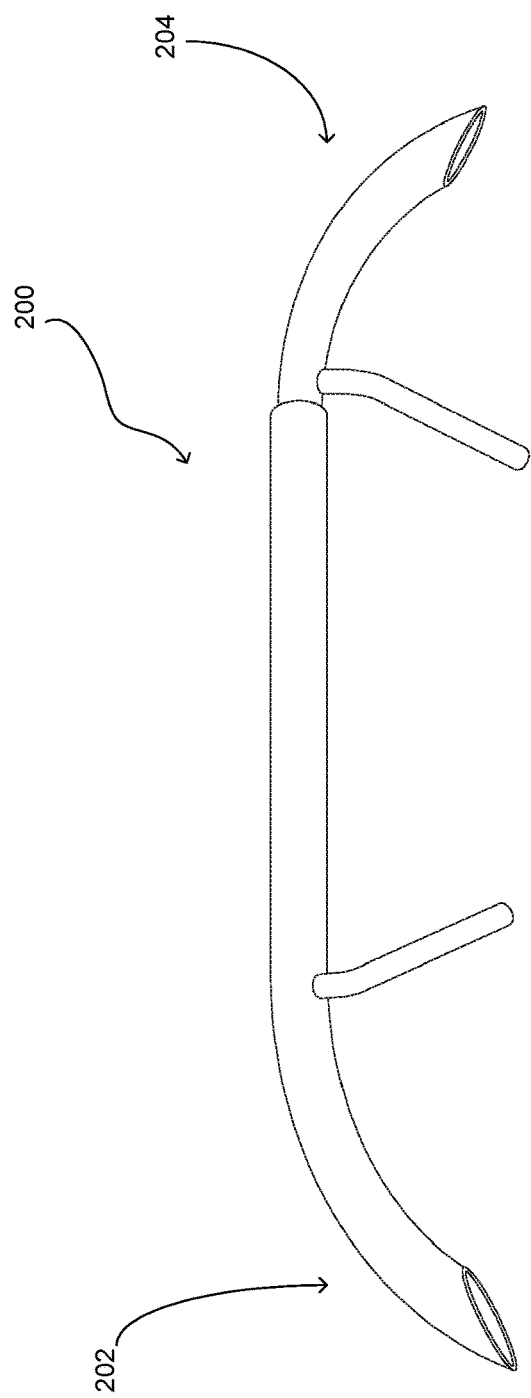
FIG. 5 is a side alternative embodiment of the present invention.

Illustrated herein in FIG. 5 is an alternative embodiment of the clip 100. Clip 200 is manufactured identically to clip 100 as described in detail herein. Clip 200 differs wherein the first end 202 and second end 204 are formed in an arcuate shape. The arcuate shape of the first end 202 and second end 204 are formed so as to enable the accommodation of elements such as but not limited to ropes that are superposed on the exterior surface of the fiberglass shroud 99. All other features and elements of the clip 200 are identical to the clip 100.

While the clip 100 has been described herein as being utilized to secure opposing halves of a fiberglass shroud 99 surroundably mounted to a cellular tower, it should be recognized by those skilled in the art the clip 100 could be utilized to secure additional structures and/or elements. Furthermore, it should be understood that the clip 100 could be used in place of and/or in conjunction with other conventional fasteners utilized to secure the fiberglass shrouds of conventional cellular phone towers.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A clip configured to bias a first item towards a second item comprising:
    a first tube member, said first tube member being cylindrical having an outer wall and an interior volume, said first tube member having a first end and a second end, said first tube member having an opening proximate said first end;
    a second tube member, said second tube member being cylindrical having an outer wall and an interior volume, said second tube member having a first end and a second end, said second tube member having a diameter that is less than that of said first tube member, said second tube member being slidably coupled with said first tube member;
    a first post, said first post being secured to said first tube member proximate said second end, said first post having a portion extending into said interior volume of said first tube member;
    a second post, said second post being secured to said second tube member proximate said second end, said second post having a portion extending into the interior volume of said second tube member;
    a biasing member, said biasing member being disposed within the interior volume of said first tube member and said second tube member, said biasing member operably coupled to the portion of the first post extending into the interior volume of the first tube member and the second post extending into the interior volume of the second tube member; and
    wherein the clip is movable intermediate a first position and a second position.

2. The clip as recited in claim 1, wherein the outer wall of the second tube member include a flared end proximate the first end thereof.

3. The clip as recited in claim 2, and further including at least one depression, said at least one depression being formed in the outer wall of the first tube member, said at least one depression configured to engage the flared end of the second tube member.

4. The clip as recited in claim 3, wherein said first post further includes a first portion and a second portion, said second portion being angular with respect to said first portion.

5. The clip as recited in claim 4, wherein said second post further includes a first portion and a second portion, said second portion of said second post being angular with respect to said first portion of said second post.

6. The clip as recited in claim 5, and further including an attachment member, said attachment member being secured to said first post, said attachment member configured to be positioned within an interior of an item being secured by the clip.

7. The clip as recited in claim 6, wherein the biasing member is a spring.

8. A clip operable to secure opposing halves of an external shroud mounted to a cellular tower comprising:
    a first tube member, said first tube member being cylindrical having an outer wall and an interior volume, said first tube member having a first end and a second end, said first tube member having an opening proximate said first end;
    a second tube member, said second tube member being cylindrical having an outer wall and an interior volume, said second tube member having a first end and a second end, said second tube member having a diameter that is less than that of said first tube member, said second tube member having a diameter that is less than that of said first tube member so as to facilitate slidably coupling of said first tube member and said second tube member;
    a first post, said first post being secured to said first tube member proximate said second end, said first post having a first portion and a second portion, wherein a section of said first portion extends into said interior volume of said first tube member and is secured therein;
    a second post, said second post being secured to said second tube member proximate said second end, said second post having a first portion and a second portion, wherein a section of said first portion of said second post extends into said interior volume of said second tube member and is secured therein;
    a spring, said spring being disposed within the interior volume of said first tube member and said second tube member, said spring operably coupled to the first portion of the first post extending into the interior volume of the first tube member and the second post extending into the interior volume of the second tube member; and
    wherein the clip is movable intermediate a first position and a second position.

9. The clip as recited in claim 8, wherein said second portion of said first post is angular in manner with respect to said first portion of said first post.

10. The clip as recited in claim 9, wherein said second portion of said second post is angular in manner with respect to said first portion of said second post.

11. The clip as recited in claim 10, wherein said outer wall of said first tube member further includes a depression formed therein.

12. The clip as recited in claim 11, and further including an attachment member, said attachment member being secured to said first post, said attachment member configured to be positioned on an opposing side of the external shroud with respect to the clip.

13. The clip as recited in claim 12, wherein the outer wall of the second tube member includes a flared end proximate the first end thereof, the flared end operable to engage the depression when the clip is moved to said second position.

14. The clip as recited in claim 13, wherein said second post and said first post include a rounded end distal to said second tube member and said first tube member respectively.

15. The clip as recited in claim 14, wherein said second portion of said second post and said second portion of said first post are angled towards each other.

16. A clip configured to releasably secure opposing halves of a fiberglass shroud surroundably mounted to a cellular tower comprising:
   a first tube member, said first tube member being cylindrical having an outer wall and an interior volume, said first tube member having a first end and a second end, said first tube member having an opening proximate said first end;
   a second tube member, said second tube member being cylindrical having an outer wall and an interior volume, said second tube member having a first end and a second end, said second tube member having a diameter that is less than that of said first tube member, said second tube member having a diameter that is less than that of said first tube member so as to facilitate slidably coupling of said first tube member and said second tube member;
   a first post, said first post being secured to said first tube member proximate said second end, said first post having a first portion and a second portion, said first portion and said second portion being contiguously formed, said second portion being angular in manner with respect to said first portion, wherein a section of said first portion extends into said interior volume of said first tube member and is secured therein;
   a second post, said second post being secured to said second tube member proximate said second end, said second post having a first portion and a second portion, said second portion of said second post being angular in manner with respect to said first portion of said second post, wherein a section of said first portion of said second post extends into said interior volume of said second tube member and is secured therein;
   a spring, said spring being disposed within the interior volume of said first tube member and said second tube member, said spring operably coupled to the first portion of the first post extending into the interior volume of the first tube member and the second post extending into the interior volume of the second tube member; and
   wherein the clip is movable intermediate a first position and a second position and wherein the spring is operable to maintain a biased pulling force so as to facilitate securing of opposable halves of a fiberglass shroud.

17. The clip as recited in claim 16, wherein said outer wall of said first tube member further includes a depression formed therein.

18. The clip as recited in claim 17, and further including an attachment member, said attachment member being secured to said first post, said attachment member configured to be positioned on an opposing side of the fiberglass shroud with respect to the clip.

19. The clip as recited in claim 18, wherein the outer wall of the second tube member includes a flared end proximate the first end thereof, the flared end operable to engage the depression when the clip is moved to said second position.

20. The clip as recited in claim 19, wherein the first tube member and second tube member are manufactured from metal.

\* \* \* \* \*